United States Patent [19]

Montgomery

[11] Patent Number: 4,675,791

[45] Date of Patent: Jun. 23, 1987

[54] CENTRIFUGE STROBE LAMP HOLDER

[75] Inventor: Melvin G. Montgomery, Plano, Tex.

[73] Assignee: Atlantic Richfield Company, Los Angeles, Calif.

[21] Appl. No.: 747,545

[22] Filed: Jun. 21, 1985

[51] Int. Cl.[4] .............................................. G03B 15/02

[52] U.S. Cl. ........................................ 362/3; 362/307

[58] Field of Search ................. 362/3, 5, 16, 256, 307, 362/308, 347, 296, 310, 311; 354/76, 145.1

[56] References Cited

U.S. PATENT DOCUMENTS 4,304,479 12/1981 Van Allen ............................ 362/16

FOREIGN PATENT DOCUMENTS 1580445 9/1969 France ............................... 362/256

OTHER PUBLICATIONS

Society of Petroleum Engineers SPE 12128, "Multiphase Relative Permeability Using an Automated Centrifuge", by D. J. O'Meara, Jr. & W. O. Lease, 1/1983.

*Primary Examiner*—Craig R. Feinberg
*Assistant Examiner*—David A. Okonsky
*Attorney, Agent, or Firm*—M. David Folzenlogen; Michael E. Martin

[57] ABSTRACT

An improved strobe lamp holder is formed of a member with a semi-circular appearing, trough-like, reflective curved inner surface in the direction of the axis of the member. Covering the light emitting opening of the lamp is a light diffusing material. Covering the open ends of the trough-like curved surface is a light confining material. The holder is adapted for placement of a strobe bulb inside the trough-like curved surface, diffusive material and light confining ends is a strobe bulb. The improved strobe lamp holder is adapted to emit light rays in a predominantly rectangular pattern with the length of the rectangle oriented perpendicular to the axis of the reflecting curved surface. The improved strobe lamp holder is designed for use in centrifuge measurement of liquid production into or out of mineral cores. The improved holder confines, orients, condenses, uniforms and emits the light from a stobe bulb in a uniform, high intensity, rectangular pattern, thereby enabling measurements in a single flash with improved accuracy and resolution.

4 Claims, 6 Drawing Figures

CENTRIFUGE STROBE LAMP HOLDER

This invention pertains to a strobe lamp holder for flashing light through a centrifuge catch tube into which liquids are produced as a mineral core sample is centrifuged under controlled conditions. More particularly, the strobe lamp holder is designed to transmit light in a noncircular, light preserving and concentrating manner with the light rays spread more evenly from side to side like a parabola would do to a point light source.

The relative permeabillity and capillary pressure of mineral core samples are measured by centrifuging liquids into or out of the cores. Usually, the core is prepared in a way that it is filled with water or oil; but measurements may be on cores containing both water and oil and sometimes measurements are made by centrifuging oil or water into a clean core. Normally, however, the centrifugal measurement of the core sample entails placing the liquid-bearing core sample in a core holder which communicates with a transparent catch tube. The catch tube is also called a collection tube. The tube may or may not be graticulated. The catch tube may or may not be encased in an opaque outer holder which is narrowly slotted for light transmission through the catch tube. Usually, four or six coreholders are used per centrifuge. The core holders are placed in a centrifuge and spun at a fairly precise speed or at different speeds. Speeds up to 20,000 rpm are used. A strobe lamp and special camera with a linear photodiode array are used to measure the volume of liquid produced from each core into a transparent catch tube.

A linear array camera is also called a line scan camera. This is significant to this invention. A linear array is a very narrow line of very small photodiodes about an inch long. The diodes are on a spacing as as small 1728 photodiodes in a linear inch, that is, less one mil in spacing. For centrifuge measurements, this small length array is designed to see up to about three inches. The significance of this description of a linear array (line scan) camera will hereafter be made apparent.

The strobe lamp is placed in line with the catch tube path and at one side of the centrifuge. Usually, the strobe lamp is laid on the bottom side of the centrifuge. The linear photodiode array of the camera is also placed in line with the catch tube path and on the opposite side of the centrifuge. Usually there is an aperature in the top of the centrifuge for the camera lens. The camera sees some background light until the strobe lamp is flashed. Some centrifuges have transparent plastic tops. This is significant to this invention. Prior art centrifugal systems require more than one light flash per measurement. Compounding the background light by multiple flashes per measurement creates noise that obscures measurement of the liquid interfaces inside the catch tube.

The strobe lamp is flashed on command at a moment synchronized with the rotational speed of the centrifuge and the position of the catch tube when it is in line with the camera and strobe lamp. The strobe flash transmits light through the catch tube to the camera. This appears to momentarily freeze the motion of the catch tube. The amount of light transmitted through the tube is detected by the thousand or more individual diode-capacitor combinations in the linear array. The frequency at which the strobe is flashed is dependent on a number of factors. These are in part dependent on the strobe light characteristics and on whether or not the liquid volume per unit time must be measured.

One key factor in accurately and rapidly measuring the position of the liquid interface in the catch tube is the uniformity and intensity of the light and the number of flashes it takes to make a measurement. A typical strobe lamp uses a circular reflector with discrete flat reflector surfaces designed to cause the light to be concentrated into a circular pattern. This standard system causes noise, hot spots, unreliable measurements, and wastes light.

Prior art standard bulbs waste light because the light pattern produced by this ordinary type of strobe lamp is a circular pattern not conforming to the nature of a line scan camera. It also wastes light because the light hitting and passing through the catch tube is low and is only a small percentage of the light produced in the flash. This in turn causes the need for multiple flashes per measurement. Multiple flashes increases light wastage and compounds background noise problems. Moreover, although every attempt is made to control the speed of the centrifuge, some variation does occur. When speeds up to 20,000 rpm and the need for consistent exact alignment of the major axis of catch tube and line scan camera are considered, it can be readily seen that multiple flashes per measurement leads to fuzzy or inaccurate results. All of this is compounded by the bright or hot spots created by standard strobe lamps.

Prior art standard strobe lamps also create hot spots. The photodiodes of the camera act as small capacitors. Each photodiode stores a charge which is proportional to the amount of light impinging on its surface. Each photodiode yields one "picture element" (pixel). The camera has internal electronics which tend to saturate during bright spots. This causes some pixels to go dark thereby losing the camera reading or losing contrast.

These problems are recognized by D. J. O'Meara, Jr. and W. O. Lease in an article entitled "Multiphase Relative Permeability Measurements Using an Automated Centrifuge", Society of Petroleum Engineers of AIME, SPE 12128 (1983). To overcome some of these problems, the authors proposed imbedding two strobes bulbs in a piece of heavily sandblasted plexiglass with the strobe bulbs placed off a direct line of sight from the camera. Sandblasting the plexiglass provided a pebbly surface which was then painted reflective white. But this two bulb strobe flash system still had to be flashed three or more times per reading. Even then, the authors had to use a floating light-diffracting material on the interface of the liquid. In addition, the authors found it necessary to replace the standard round cross-section catch tubes with expensive precision ground catch tubes of square cross section.

It is an object of this invention to provide an improved strobe lamp holder that is suitable for defining liquid interfaces in a centrifuge core measurement catch tube with a single flash. The light rays produced by the improved strobe lamp holder are captured, condensed, and specially configured and oriented. The light transmitted by the strobe lamp holder is also sufficient for ordinary catch tubes of round cross section. The improved strobe lamp holder of this invention also eliminates the need for floating light-diffracting materials on the interface liquid because of the single flash per measurement and the enhanced and specially configured and oriented light rays transmitted by the improved strobe lamp holder.

It is a further object of this invention to provide an improved strobe lamp holder that is capable of transmitting light in a nearly rectangular pattern wherein the light rays are more uniform from side to side and top to bottom in a manner like a parabola would do a point light source. The light in transmitted in a rectangular pattern with the height being smaller than the width. In use, the width of the rectangular uniform light pattern if aligned parallel to the major axis of a centrifuge catch tube. The light transmitted by the improved strobe lamp holder, therefore, is also free of bright (hot) spots that would interfere with measuring liquid levels in a centrifuge catch tube.

It is still a further object of this invention to provide an improved strobe lamp holder that is simple to make. The improved strobe lamp holder does not waste light in a circular pattern or any other over large pattern. The improved strobe lamp holder tends to act like as parabola in one direction. This concentrates the light along one axis and the light is made much more uniform from one end of the centrifuge catch tube to the other end and from side to side.

These and other objects of the present invention will become apparent from the following description when read in conjunction with the drawings, wherein.

Briefly, in accordance with the present invention, it has been found and proven that a liquid interface or that liquid-liquid interfaces in ordinary round cylindrical centrifuge catch tubes can be accurately determined with a single strobe flash per measurement if the strobe lamp holder is formed in the special manner of this invention. The strobe lamp holder of this invention has a member with length and width. The strobe lamp holder has light confining reflective sections and a curved inner reflective surface. The reflective end sections and curved inner surface confine and concentrate the light from a strobe bulb and are adapted to cause the holder to emit light in a substantially rectangular pattern. The length of the rectanglar pattern is designed to be parallel to the major axis of a catch tube when the strobe lamp holder of this invention is used in a centrifuge core measuring system. The strobe light holder has a diffusive layer through which the light is transmitted. The diffusive layer coacts with the rectangular light pattern and spreads the captured and reflected light rays uniformly across the rectangular light pattern thereby virtually eliminating interfering bright spots. These features of the improved strobe lamp holder cause the light diverging from a strobe bulb to impinge on the reflective surfaces which reflects the light from the strobe bulb in a uniform manner from one side of the curved inner surface of the segment to the other side of the segment. The light rays are transmitted from the lamp in a side to side line in a narrow rectanglar pattern with the light rays acting as though they were oriented to be parallel to the major axis of a centrifuge transparent catch tube. The improved light intensity, uniformity, orientation and configuration enhances detection and measurement of a liquid interface inside the catch tube and of graticulate reference marks on the catch tube with a single strobe flash and with improved accuracy and resolution.

Figure 1:
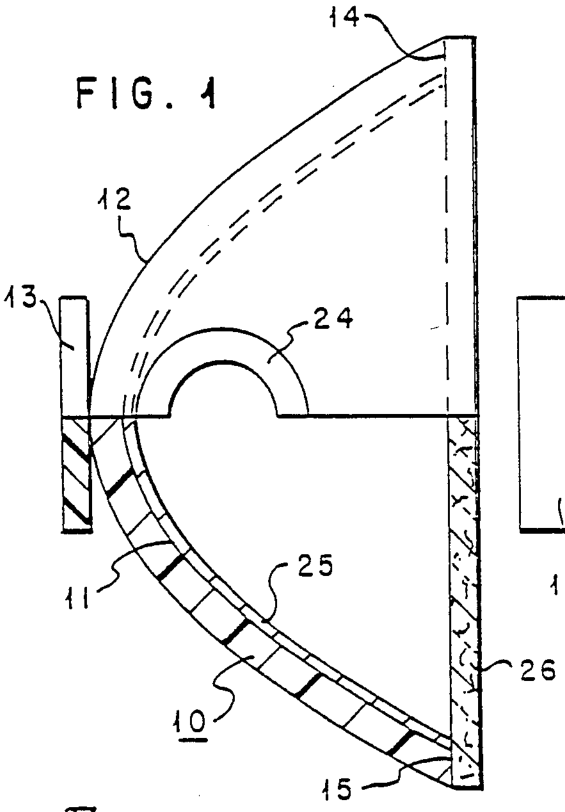
FIG. 1 is a top elevational view, partly in section, of the improved strobe lamp holder of this invention.
Figure 2:
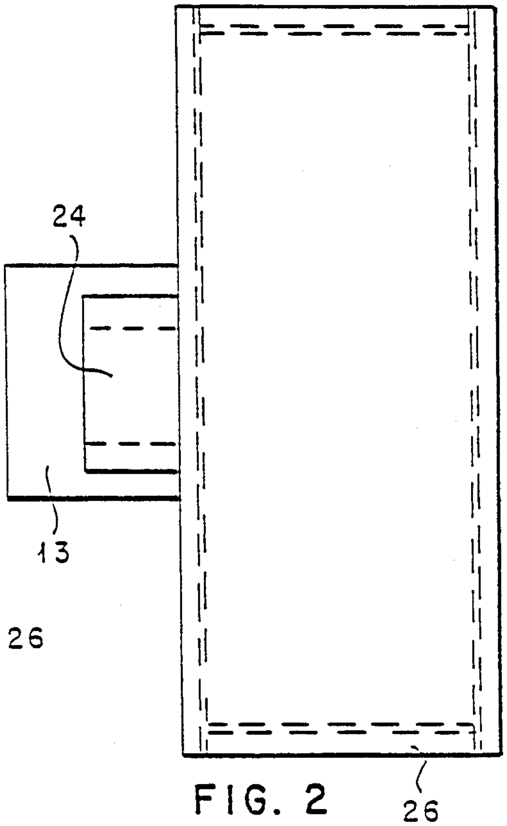
FIG. 2 is a front elevational view of the improved strobe lamp holder of FIG. 1 especially showing its rectangular configuration.
Figure 3:
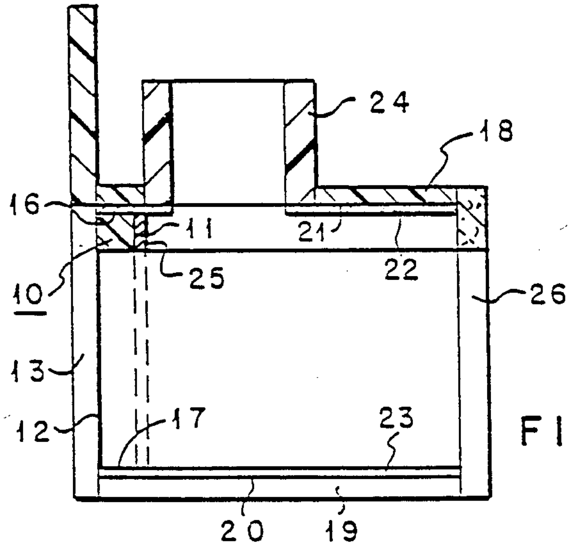
FIG. 3 is a side elevational view, partly in section, of the improved strobe lamp holder of FIG. 1.

Accordingly, in FIGS. 1, 2 and 3, there is shown a strobe lamp holder with reflector segment or member 10 which has curved inner surface 11 and outer surface 12. Outer surface 12 of the lamp holder may be any shape and is not critical to this invention. For example, it may be made flat to lie on the bottom of a centrifuge. Shown for this purpose is flat piece 13 which is attached to member 10.

Member 10 has the general appearance of a semicircle, but it is not necessarily a circle. In fact, it is preferred that the curve be more parabolic than circular. The curved inner surface end edges 14 and 15 at the extremities of the curved portion. Thus, inner surface 11 forms a trough-like section appearing to half way surround its central axis.

The improved strobe lamp holder of this invention is adapted to coact with a flashing of a strobe bulb to emit a rectangular light pattern. This adaptation may be accomplished in a number of ways, but the preferred way is hereinafter described. Therefore, in order to form and confine the strobe light holder to a highest intensity rectangular light emitting area, it is preferred that end edges 14 and 15 are substantially parallel to the axis of the curved portion of member 10. The curved inner surface can be formed by machining, extrusion, molding or any other suitable process. Member 10 has other edges 16 and 17. Normally, but not necessarily, the distance between edge 16 and edge 17 will be less than the distance between end edge 14 and end edge 15. The ends of trough-like member 10 near edges 16 and 17 are covered with light confining sections 18 and 19 which may be made of any suitable material, for example, plastic or mirror sections. The light is trapped to prevent undesirable light wastage and light noise. If end edges 14 and 15 define the light emitting area of the strobe lamp holder, it is important that inner end edges 20 and 21 of light confining sections 18 and 19 be substantially perpendicular to end edges 14 and 15. This alignment of the end edges and the relative distances between the end surfaces makes the strobe lamp holder form a rectangular light emitting pattern. Preferably, light confining sections 18 and 19 are made light reflective by polishing or by coating or covering their inner surfaces with reflective substance 22 and 23, respectively. At any appropriate location other than the light emitting portion of the strobe lamp holder is means 24 adapted to permit a strobe bulb (not shown) to be placed in the strobe lamp holder. As shown, means 24 is a short piece of plastic pipe located near the bottom point of the trough-like portion of the curved inner surface 11. A substantial portion of the inner surface 11 is polished or is covered or coated with light reflecting with suitable conventional light reflective substance 25, for example, the chrome appearing coating used in many flashlight reflectors, aluminum foil or the like.

Covering the open light emitting portion of member 10 and extending between end edges 14 and 15 and light capturing sections 18 and 19 is light diffusing layer 26 which is characterized by the fact that it diffuses the light from the strobe bulb and reflecting from reflecting substance 25 and spreads the light in a more uniform manner over the light transmitting opening of member 11. The diffusing layer will be made of known diffuser materials, for example, a piece of milky plexiglass.

Figure 4:
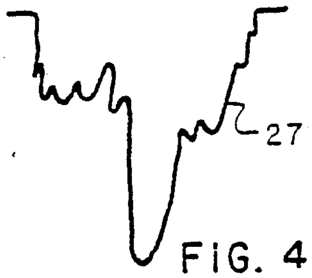
FIG. 4 (PRIOR ART)
FIG. 4 illustrates the light intensity across the width of the light pattern projected to a line scan camera by standard prior art strobe lamps.
Figure 5:
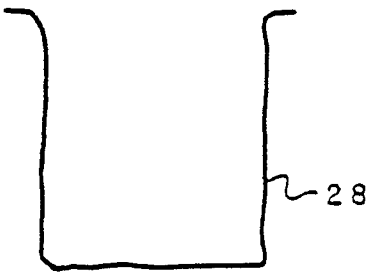
FIG. 5 illustrates the ideal light intensity across the width of the light pattern that would be projected by a true parabolic reflector and point light source.
Figure 6:
FIG. 6 illustrates the light intensity across the width of the light pattern projected by the strobe lamp holder of this invention.

In operation, when the strobe lamp holder of this invention is flashed, the light rays from the bulb diverge in all directions striking reflecting light confining sections 18 and 19 and striking reflective curved inner surface 11 of member 10. The light rays are reflected in a rectangular pattern through diffusing layer 26. The rectangular configuration, confining sections, curved surfaces and diffusive layer combine to cause the light rays to be transmitted from the strobe lamp holder in a uniform manner much like the way a parabola coacts with a point source. This is illustrated in FIGS. 4, 5 and 6. FIGS. 4 and 6 were taken with a line scan camera and depict light intensity across the photodiode linear array. Line 27 of FIG. 4 illustrates how the line scan camera saw the strobe light emitted by a standard strobe reflector. The uneveness and intense bright spot are readily seen. Line 28 of FIG. 5 is not an actual measurement. It merely illustrates the ideal pattern. Line 29 of FIG. 6 illustrates how the line scan camera saw the strobe light emitted by the improved strobe holder of this invention. The eveness of the light across camera linear array and improvement over the prior art of FIG. 4 is readily noted. The improved strobe lamp holder was formed by cutting away a part of a piece of four inch polyvinylchloride (PVC) pipe to form member 10. Light capturing sections were formed of three pieces each. Appropriate size semicircular portions of glass mirror were divided and cut to permit insertion of a piece of flat plastic between glass mirror sections. This enabled easier inclusion of plastic pipe means 24. The PVC pipe was softened with a heat gun and the light confining sections were pushed into inner surface 11 of the PVC member 10. Inner surface 11 was coated with aluminum foil. Then the light emitting opening was covered with a piece of milky plexiglass which acted as diffusing layer 26. To assist laying the holder in the bottom of a centrifuge and aligning the holder with the camera, flat piece 13 was glued to the outer side of member 10 and a strobe bulb was inserted through tube 24.

The significance of the rectangular, uniform light pattern emitted by the improved strobe light of this invention will now be additionally illustrated. The strobe lamp holder of this invention is designed for a centrifuge core measuring system. In use, the strobe lamp holder with strobe bulb is placed on one side of a centrifuge. A linear array photodiode camera is placed on the other side of the centrifuge. The camera and strobe lamp are lined up with the circular path followed by the catch tubes in the centrifuge when the centrifuge is spinning and the catch tube is extended inwardly or outwardly in a flat plane. The linear very narrow, short line of photodiodes, the side to side light rays of the strobe lamp and the major axis of the catch tube thereby lie in the same plane. This maximizes the effects of the light rays and reduces wastage of light. In operation, therefore, the light from the strobe is transmitted equally from side to side over the length of the transparent part of the catch tube or the narrow slot opening in the walls of an opaque catch tube holder to directly strike the very small diode-capacitor combinations of the linear array camera in the same plane on the opposite side of the catch tube. The uniformity and predominant orientation of the light rays transmitted from the strobe provide sufficient light intensity to enable accurate detections of any liquid interface inside the catch tube in a single flash without the use of diffracting substances floating on the liquid interface inside the catch tube.

The necessary elements of the improved strobe lamp have been described, but various modifications may be apparent to persons skilled in the art upon reference to this description. It is, therefore, contemplated that the appended claims will cover any such modification or embodiments as fall within the true scope of the invention.

What is claimed is:

1. A strobe lamp holder for illuminating a liquid interface in a transparent catch tube being spun in a centrifuge core measurement system comprising:

a member having a symmetric trough-like curved inner surface and having a width greater than its axial length with respect to an axis of said curved inner surface, said curved inner surface extending along the width of said member and partially curved around said axis, said curved inner surface being substantially made light reflective;

light confining material covering the ends of said member in spaced apart planes normal to the axis of said curved inner surface to form a rectangular light emitting opening, at least a portion of the inner surface of said light confining material being made light reflective;

light diffusing material covering said rectangular light emitting opening for causing light reflected from said curved inner surface and said light confining material to be transmitted from said holder substantially uniformly from said rectangular light emitting opening; and means adapted to permit a strobe bulb to be located between said curved inner surface and said light diffusing material and also located between said light confining material covering said ends of said member.

2. The strobe lamp holder of claim 1 wherein said light diffusing material is milky plexiglass.

3. The strobe lamp holder of claim 1 wherein said member is formed from a section of polyvinylchloride plastic pipe.

4. The strobe lamp holder of claim 3 wherein said curved inner surface is made reflective with aluminum foil substantially conforming to said curved inner surface.

* * * * *